(12) United States Patent
Johnson (10) Patent No.: US 8,209,350 B1
(45) Date of Patent: Jun. 26, 2012

(54) STORING AND MAINTAINING CONSISTENCY AMONG FOLIOS HOLDING ASSOCIATED INFORMATION

(75) Inventor: Steve Johnson, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 368 days.

(21) Appl. No.: 11/900,915

(22) Filed: Sep. 12, 2007

(51) Int. Cl.
*G06F 7/00* (2006.01)
*G06F 17/30* (2006.01)

(52) U.S. Cl. ......... 707/793; 707/803; 707/804; 707/807

(58) Field of Classification Search ............. 707/10, 707/102, 203, 790, 793, 803, 804, 807, 999.102, 707/999.203
See application file for complete search history.

(56) References Cited

U.S. PATENT DOCUMENTS

| | | | |
|---|---|---|---|
| 5,793,970 A * | 8/1998 | Fakes et al. ............... 709/216 |
| 5,924,098 A * | 7/1999 | Kluge .......................... 1/1 |
| 6,473,767 B1 * | 10/2002 | Bailey et al. ................... 1/1 |
| 6,938,030 B1 * | 8/2005 | Simone et al. .................. 1/1 |
| 6,993,487 B2 * | 1/2006 | Bluvband .................. 704/275 |
| 7,275,063 B2 * | 9/2007 | Horn .............................. 1/1 |
| 7,296,025 B2 * | 11/2007 | Kung et al. ..................... 1/1 |
| 7,599,950 B2 * | 10/2009 | Walther et al. .................. 1/1 |
| 2002/0029231 A1 * | 3/2002 | Aptus et al. ............... 707/513 |
| 2005/0033764 A1 * | 2/2005 | Reid ......................... 707/102 |
| 2005/0229156 A1 * | 10/2005 | Baumann .................... 717/110 |
| 2005/0289109 A1 * | 12/2005 | Arrouye et al. ................. 707/1 |
| 2006/0052089 A1 * | 3/2006 | Khurana et al. ............ 455/414.1 |
| 2006/0095447 A1 * | 5/2006 | Dickinson et al. ........... 707/100 |
| 2006/0101443 A1 * | 5/2006 | Nasr ........................... 717/163 |
| 2006/0167861 A1 * | 7/2006 | Arrouye et al. ................. 707/3 |
| 2007/0094312 A1 * | 4/2007 | Sim-Tang ................... 707/204 |
| 2007/0266007 A1 * | 11/2007 | Arrouye et al. ................. 707/3 |
| 2007/0276905 A1 * | 11/2007 | Durand et al. ............... 709/203 |

* cited by examiner

*Primary Examiner* — Jean B Fleurantin
*Assistant Examiner* — Mark Hershley
(74) *Attorney, Agent, or Firm* — Nelson Mullins Riley & Scarborough LLP (57) ABSTRACT

Some embodiments of the invention provide methods, mediums, and systems for collecting and updating associated information. The present invention also provides a method and system for managing associated information in one file structure. Associated information can be generated from a source file or data and a portfolio can be generated to collect and store the source file or data and the associated information. A portfolio can include multiple folios storing different aspects of information that are related to one another. Each folio can associate information with aspects of other folios. When a change has occurred on a folio, an update strategy is used to update related folios and a map may be optionally generated. The map may provide information that allows dependent folios to understand what was changed. The map may remain in existence until all the dependent folios have adapted to the change. The invention provides a way to make it easy to associate information with one another and also provides a way to make sure associated information are updated accordingly when a change has occurred in the s related information.

12 Claims, 6 Drawing Sheets

STORING AND MAINTAINING CONSISTENCY AMONG FOLIOS HOLDING ASSOCIATED INFORMATION

BACKGROUND

Programmers can use a programming language to build programs, functions and modules, by writing text files containing programming language code ("code"). During the process of writing, testing, debugging and modifying code, a great deal of information may be generated that is useful to associate with the code. For example, information, such as source code control version information, modification history, performance information, test coverage information, bug reports and associated fixes are information that is useful to associate with the code. Some information may be stored with the code in the form of comments, whereas other information may be saved in external databases or files.

SUMMARY

One exemplary embodiment is directed to collecting different related information into one file structure. Information associated with or derived from the stored information, such as documentation and reports, can be generated from a version of the source file and stored in a portfolio. A portfolio can have one or more sections called folios. Each folio has specific content such as, for example, a floor plan, an electrical layout, building details, source code, a parse tree, a symbol table, data, comments, test coverage results, bug reports and fixes, documentation in different languages, etc.

In one embodiment, each folio contains information about when the folio was last valid. In another embodiment, each folio may also contain validity information describing the folios on which it depends, and may contain the details describing the dependencies. When a first folio depends on a second folio and information in the second folio changes, information in the first folio may be marked as potentially out of date. In such a case, the first folio needs to be reviewed to see if any of the information contained in the first folio needs to be changed.

In one embodiment, when a folio is changed, a software table referred to as a "map" is generated. The map provides information that allows dependent folios to understand what was changed so that the dependent folios can make changes to their contents accordingly. The map may remain in existence until all the dependent folios have adapted to the change. Hence, due to the dependencies among the folios, any change in one folio forces a review of the dependent folios so that any related information in the dependent folios is updated accordingly. Additionally, a portfolio can keep all the related information with the source code in one structured document; hence, retrieval of any information from the portfolio is easy and convenient.

In another embodiment, a method for updating associated information associated is provided. The method includes providing a portfolio containing a first folio holding content that is executable and a second folio holding content that is related to the content held in the first folio a plurality of folios. Dependency information that describes a dependency relationship between the content held in the first folio and the second folio may be provided. An update strategy associated with the dependency file is provided for updating the second folio when a change occurs in the first folio. The automated update strategy describes the steps that need to be taken to maintain consistency between the content held in the first folio and the second folio when the second folio changes.

In an additional embodiment, a method for collecting information related to a source code into a single file structure is provided. The method includes receiving the source code with a plurality of special comments. A first folio is created. The content of the first folio includes text of the source code without the plurality of comments, and one or more additional folios holding content are created to be related to the content held in the first folio. The information in the comments can be used to guide the construction of a plurality of additional folios whose content is dependent on the content held in the first folio. The location of the comments in the original source code can be used to indicate specific portions of the first folio that the other folios depend on.

In yet another embodiment, a storage medium storing computer executable instructions for updating information associated with a source code is provided. The medium includes instructions for providing a portfolio containing a first folio holding content that is executable and a second folio holding content that is related to the content held in the first folio a plurality of folios. Dependency information that describes a dependency relationship between the content held in the first folio and the second folio may be provided. An update strategy associated with the dependency file is provided for updating the second folio when a change occurs in the first folio. The automated update strategy describes the steps that need to be taken to maintain consistency between the content held in the first folio and the second folio when the second folio changes.

In still another embodiment, a storage medium storing computer executable instructions for collecting information related to a source code into one file structure is provided. The medium includes instruction for receiving the source code with a plurality of special comments. A first folio is created. The content of the first folio includes text of the source code without the plurality of comments, and one or more additional folios holding content are created to be related to the content held in the first folio. The information in the comments can be used to guide the construction of a plurality of additional folios whose content is dependent on the content held in the first folio. The location of the comments in the original source code can be used to indicate specific portions of the first folio that the other folios depend on.

In yet another embodiment, a system is provided for collecting associated information related to source code and for updating the associated information. The system includes a storage for storing a portfolio for holding the related information. The portfolio contains a first folio holding content and a second folio holding content that is related to the content held in the first folio. The system also includes a dependency information for describing a dependency relationship between the content held in the first folio and the content held in the second folio. The system further includes a portfolio update tool for providing an automated update strategy associated with the dependency information for automatically updating the content held in the one of the first folio and the second folio when a change occurs in the content held in another of the first folio ad the second folio.

In still another embodiment, a method is provided for a computing device to distribute a plurality of instructions to a remote computing device. The method includes receiving a request from the remote computing device for the plurality of instructions. The plurality of instructions include instructions for providing a portfolio containing a first folio holding content that is executable and a second folio holding content that is related to the content held in the first folio a plurality of folios. The instructions also include instructions for providing a dependency information that describes a dependency relationship between the content held in the first folio and the second folio may be provided. The instructions further include instructions for providing an update strategy associated with the dependency file is provided for updating the second folio when a change occurs in the first folio. Instructions are provided for using the update strategy to maintain consistency between the content held in the first folio and the second folio when the second folio changes. The method further includes forwarding the plurality of instructions to the remote computing device.

In yet another embodiment, a method for updating information associated with source code is provided in a distributed system that includes a plurality of computing devices. The method includes distributing a plurality of computer executable instructions among the plurality of computing devices. The plurality of instructions include instructions for providing a portfolio containing a first folio holding content that is executable and a second folio holding content that is related to the content held in the first folio a plurality of folios. The instructions also include instructions for providing a dependency information that describes a dependency relationship between the content held in the first folio and the second folio may be provided. The instructions further include instructions for providing an update strategy associated with the dependency file is provided for updating the second folio when a change occurs in the first folio. Instructions are provided for using the update strategy to maintain consistency between the content held in the first folio and the second folio when the second folio changes. The method further includes executing the plurality of computer executable instructions on the plurality of computing devices.

DETAILED DESCRIPTION

It can be cumbersome for a user to review all the information that is related to a particular piece of programming language code. The user must collect the relevant information from multiple areas at multiple file locations. Additionally, as a piece of code changes over time, some previously relevant information can become out of date or irrelevant. Further, some information may still be relevant but no longer correspond to the same part of the code because one or more lines of code have been reordered or removed. Hence, there is a need to have a mechanism that can easily keep relevant information about the same code together and update the relevant information as the code changes.

Programming is not the only field where associated information can be hard to maintain up to date. For example, in the construction business, an architect can devise a floor plan and building design. An electrician needs to make sure the floor plan and the building design will accommodate the necessary electrical wiring and comply with safety codes. Sometimes, an interior designer and/or a carpenter are involved in the design of a building. Every time a floor plan is changed, many other aspects of the building design need to be changed. Currently, there is no way to associate different information of the building design, and a person needs to manually spot changes in one plan and change other associated information. Such a process can be burdensome and error-prone.

The exemplary embodiments described herein may provide methods, mediums, and systems for managing related information. A structured file, known as a "portfolio," is used to collect and manage the various related information. A portfolio may contain folios that are used to store different information. A folio may be related to one or more other folios. In one embodiment, a portfolio can include source code in a folio and the associated information in one or more other folios. The source code may include, but is not limited to a program written in a programming language and the associated information can include, but is not limited to: documentation on a portion of the program, a report, a history of changes, dependencies between folios, testing history, review history, etc. The folios that contain the associated information may be updated when there is a change in the folio that contains the source code or related information. A "map" optionally may be used to update the associated information in one or more folios when a change in another one or more folios in the portfolio is detected.

A portfolio can be implemented in a number of different ways. For instance, a portfolio can be implemented as an object, a compressed file, such as a zip file, a collection of files with coordinated names, a coordinated collection of screens in a spreadsheet or editor, a file structured using some language such as XML, or a coordinated collection of database entries. A portfolio may include subfiles/sections designated as folios. Folios can contain the same kind of data and structure as ordinary files. A folio can include any type of information, such as a graphical model, a text-based model, a spreadsheet, a report, a documentation, a history of changes, dependencies between folios, etc.

Certain exemplary embodiments will be described for illustrative purposes relative to a MATLAB®-based modeling environment. Although these embodiments will be described relative to a MATLAB® environment-based application, one of ordinary skill in the art will appreciate that the invention may be applied to other computing tasks with other computing environments. Examples of other computing environments that are suitable to practice with the invention include ones from software products of LabVIEW® or MATRIXx software from National Instruments, Inc., Mathematica® software from Wolfram Research, Inc., Mathcad software of Mathsoft Engineering & Education Inc., or Maple™ software from Maplesoft, a division of Waterloo Maple Inc, or the C/C++ programming language, the JAVA programming language, or any other programming or modeling language, such as, for example Unified Modeling Language (UML) and its variants, Hardware Description Language(s) (HDL), statistical, biological, or other modeling applications, etc.

Figure 1:
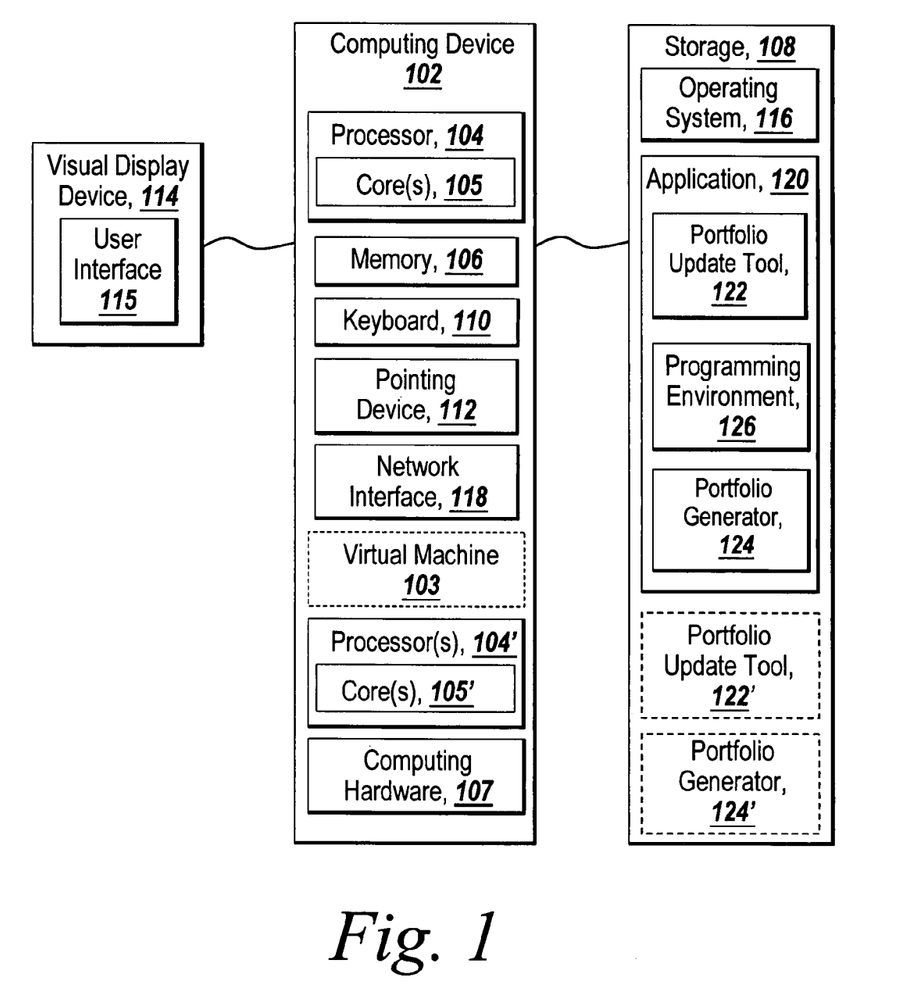
FIG. 1 is a block diagram of a computing device suitable for practicing exemplary embodiments.

FIG. 1 depicts a system suitable for practicing exemplary embodiments. The system includes a computing device 102 having memory 106, on which software according to one embodiment of the invention may be stored. The computing device 102 also includes processor 104, and optionally, one or more processor(s) 104' for executing software stored in the memory 106, and other programs for controlling system hardware. Processor 104 and processor(s) 104' can each be a single or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing hardware 107, such as field-programmable gate arrays (FPGA), application specific integrated circuits (ASIC), digital signal processors (DSP), graphics processors, and general-purpose processors (GPP), may also be used for executing code and/or software. In some instances, this hardware can be employed to speed up the general processing rate of the computing device 102.

The memory 106 may comprise a computer system memory or random access memory such as DRAM, SRAM, EDO RAM, etc. The memory 106 may comprise other types of memory as well, or combinations thereof. A user may interact with the computing device 102 through a visual display device 114, such as a computer monitor, which may include a user interface 115. The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. In an alternative embodiment, input and/or output devices may be connected to the processor 104 and/or memory 106 via a network.

The computing device 102 may further comprise a storage device 108, such as a hard-drive, CD-ROM, or other computer readable media, for storing an operating system 116 and other related software, and for storing application 120, such as MATLAB®. Application 120 includes programming environment 126, such as the programming environment that can be used to write source code. Application 120 may also include portfolio update tool 122. Portfolio generator 124 is able to generate associated information related to a source code written in the programming language 126. The portfolio generator 124 can also generate a portfolio including at least some of the associated information related to the source code. Portfolio update tool 122 is used to update the generated associated information of the source code in the portfolio when a change is detected in one of the folios in the portfolio. Portfolio update tool 122 can also regenerate a folio when a change has occurred in one of the folios in the portfolio.

Each of portfolio generator 124 and portfolio update tool 122 can be adapted to be included as part of the application 120, or it can be a stand-alone application, module, script, or program that responds to calls from the application 120, such as portfolio update tool 122' and portfolio generator 124', respectively. Source code can be written in XML, where tags can be used to flag information that belongs to a specific folio or a specific type of information. The portfolio generator 124 reads the source code and generates a portfolio and associated information according to the tags to put in different folios in the portfolio.

Source code can be written in any number of programming and/or scripting languages, for example, it may be written in the language of MATLAB® computing environment—M code—in some instances, where different types of comments are used to identify information that belongs to a specific folio or a specific type of information. The portfolio generator 124 may read the source code and generate a portfolio and associated information according to the comments. The word "comments" is used herein to refer to tags, ordinary meaning of comments in a programming language, and other notations or syntax that are used to indicate where information should be placed in a folio or how the associated information should be grouped.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system, such as any of the versions of the Microsoft® Windows® operating systems, any version of the Unix and Linux operating systems, any version of the MacOS® for Macintosh computers, any embedded operating system, any realtime operating system, any open source operating system, any proprietary operating system, any operating systems for mobile computing devices, or any other operating system capable of running on the computing device and performing the operations described herein.

Figure 2:
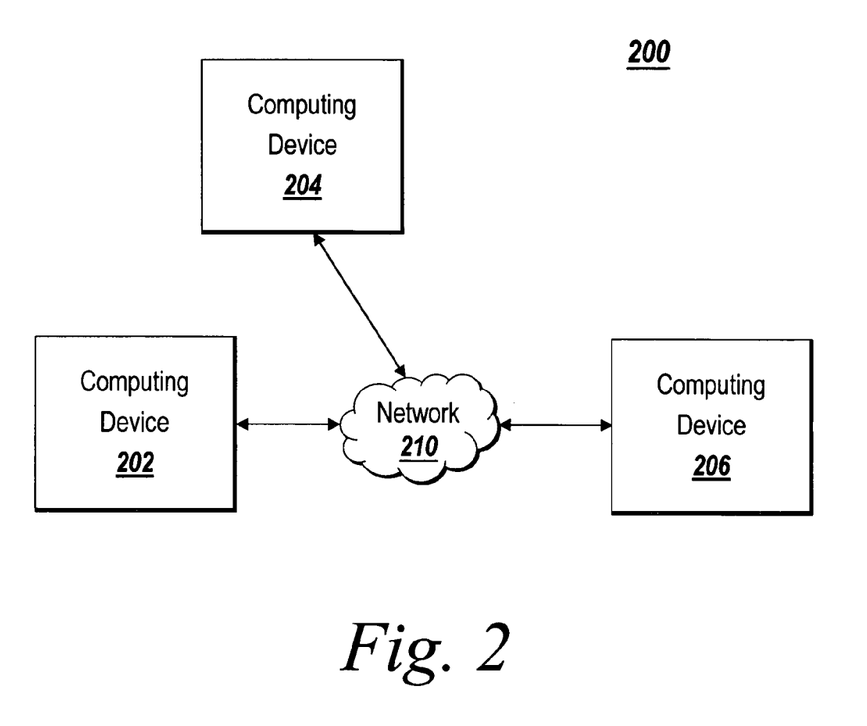
FIG. 2 is an exemplary distributed computing environment suitable for practicing exemplary embodiments.

FIG. 2 illustrates a distributed environment 200 that may be used to practice exemplary embodiments. The distributed environment 200 includes computing devices 202, 204 and 206 that are all interfaced with a network 210. The network 210 may be a LAN, a WAN or any of the other varieties of networks described above as being interfaced with the network interface 118 of computing device 102.

One or more of the computing devices 202, 204 and 206 may act as a server for providing service to one or more of the other computing devices that act as a client. Alternatively, the computing devices may act as peers in a peer to peer relationship.

Each computing device 202, 204 and 206 may store and execute all or a portion of the software and files described above for the computing device 102. For instance, one or more of computing devices 202, 204 and 206 may include a portfolio generator, a portfolio update tool and portfolios, like those described above relative to the computing device 102 of FIG. 1.

Figure 3:
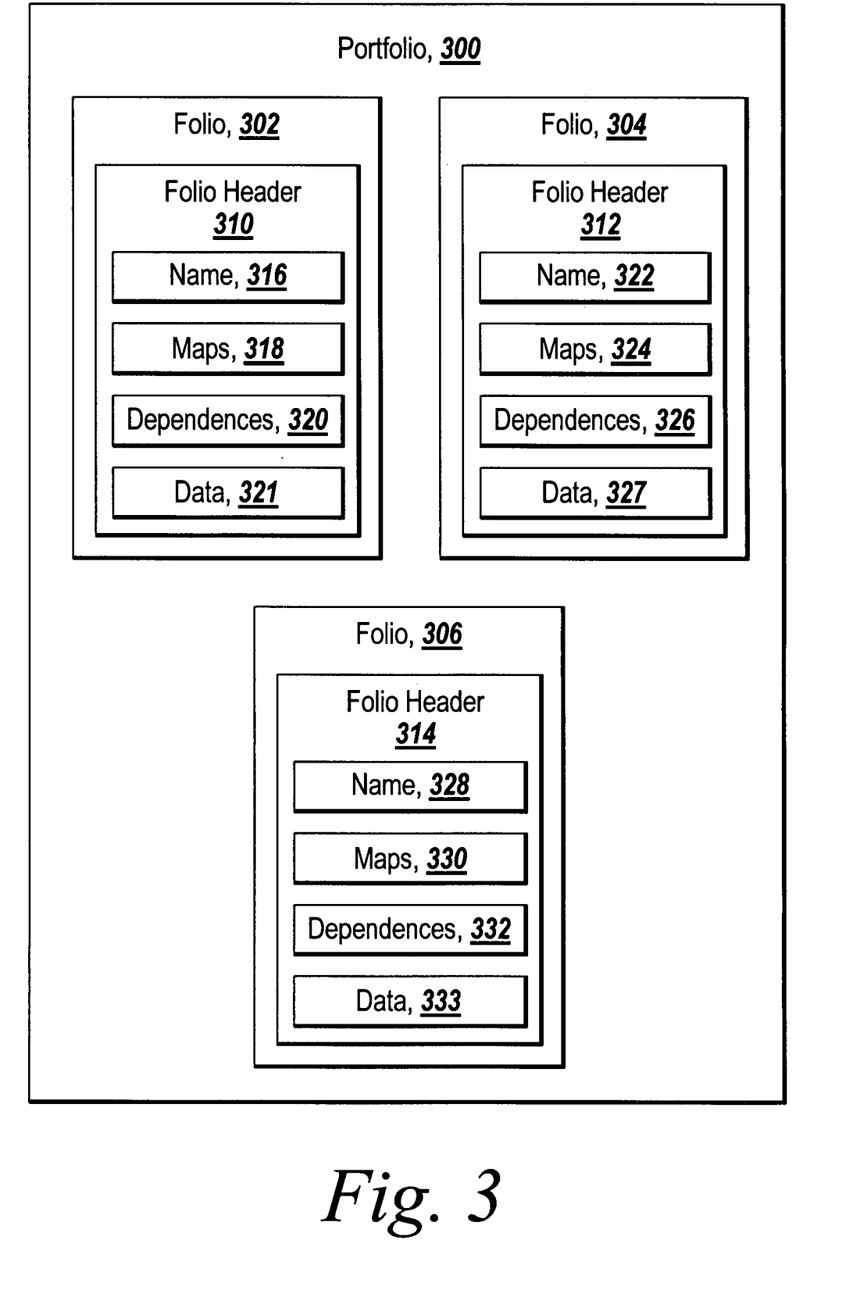
FIG. 3 illustrates an exemplary portfolio.

FIG. 3 shows an example of a portfolio 300 containing folios 302, 304 and 306. Each folio 302, 304 and 306 in the portfolio 300 may include a different type of information. For example, if a portfolio 300 includes source code and associated information, each folio 302, 304 and 306 in the portfolio 300 can include a different aspect of the source code. Examples of associated information that may be used in a folio includes but is not limited to a parse tree, a symbol table, comments, static and dynamic messages about the source code, information about what program or code uses the source code, accumulated profiling information, accumulated performance information, accumulated test coverage information, bug reports and history of fixes, information about which software product includes the source code, compiler optimization flags that should be applied when compiling the source code, documentation in one or more different language, and other information related to the source code. In this case, a folio is a collection of information about the source code.

In some embodiments, the portfolio 300 can include a program folio that includes only the executable part of the source code and excludes any comments. In other embodiments, the comments may be included in one or more other folios as part of one or more documentations. The portfolio 300 can include multiple other folios, where one folio can be dependent on the program folio and/or an additional folio.

In some embodiments, each folio 302, 304 and 306 is given a unique name. Alternatively, folios 302, 304 and 306 may not have a unique name and may be identified through other means, such as, for example, a unique identifier. A folio 302, 304 and 306 can be embodied in a file, object, spreadsheet, text editor, or database.

Each folio 302, 304 and 306 has an associated block, called a folio header 310, 312 and 314, which contains the name of the folio 316, 322 and 328, zero or more maps 318, 324 and 330, and zero or more dependencies 320, 306 and 332. Each folio header 310, 312 and 314 also includes data 321, 327 and 333 that may contain, for example, one or more of a source-code-control version number, a checksum, a timestamp, or any other suitable information.

A folio 302, 304 and 306 can associate with zero or more maps 318, 324 and 330. A map 318, 324 and 330 stores information regarding how data is changed in the folio 302, 304 and 306. Each map 318, 324 and 330 can include a version tag for a previous version of the contents of the folio, known as the base version of the folio. Each map can also include a version tag for the present version of the contents of the folio, called the target version of the map 318, 324 and 330. Each map 318, 324 and 330 can also include information describing the changes that need to be made to convert the contents of the folio 302, 304 and 306 corresponding to the base version of the map into the contents of the folio corresponding to the target version of the map. The contents of the map 318, 324 and 330 are in general dependent on the kind of information that is contained in the folio 302, 304 and 306.

A folio 302, 304 and 306 can associate with zero or more dependencies 320, 326 and 332. A dependency 320, 326 and 332 describes a relationship between the folio with another folio or other folios. Each dependency 320, 326 and 332 can include zero or more sources. A source is the identity of an entity that the information in the folio depends on. A source may be a folio in the same portfolio, but may have be a folio in another file, an ordinary file, an environment variable, or any other data source. A source is further preferred to have an associated version tag providing information about which version of the source was used to construct the current contents of the one or more folios. A source may also include an indication of whether or not a map of the changes in the source would be desirable to use to update the one or more folios. In some embodiments, a dependency does not include information on contents of the source or any folio.

Figure 4:
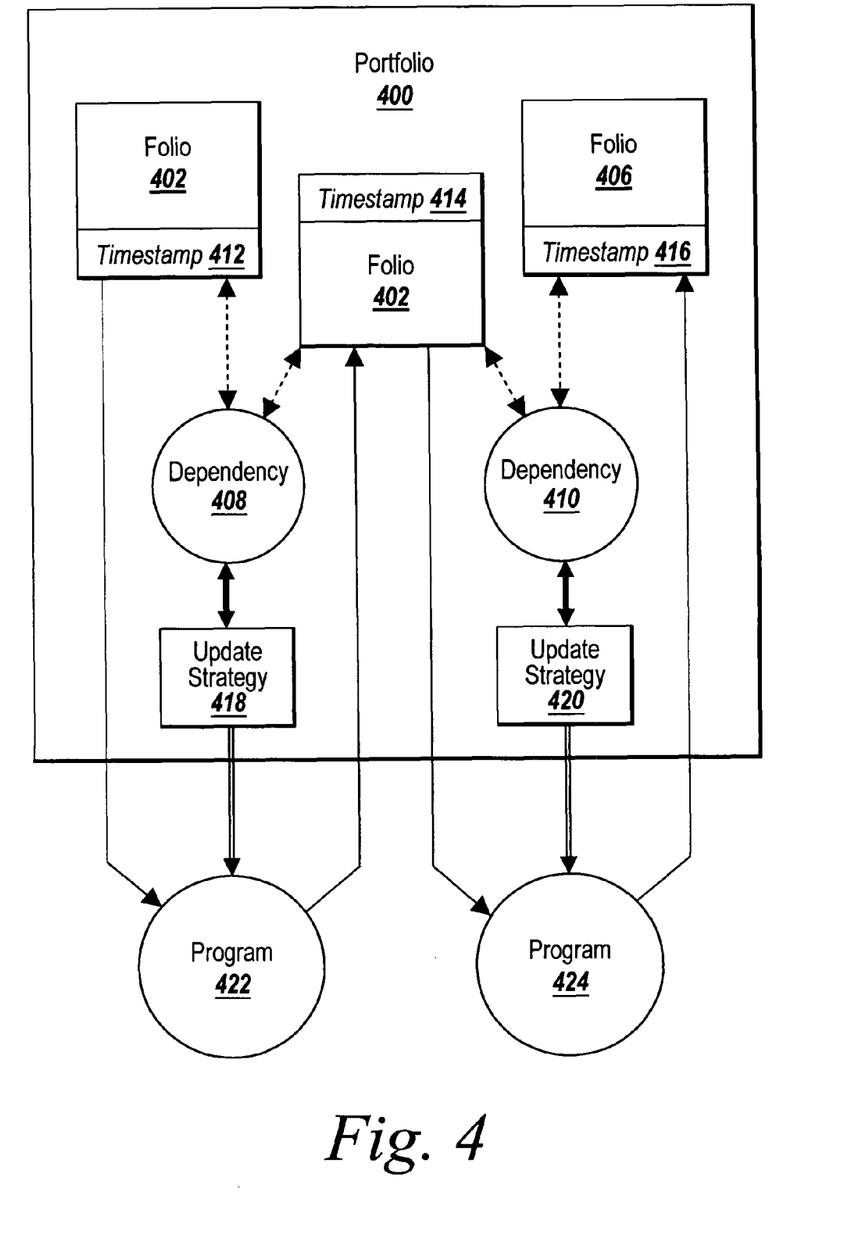
FIG. 4 illustrates the relationship of dependencies and update strategies with an exemplary portfolio.

FIG. 4 illustrates another exemplary portfolio 400. Portfolio 400 includes folio 402, folio 404, and folio 406. In this example, the data (see 321, 327 in FIG. 3) contained in the portfolio header includes timestamps 412, 414 and 416. Timestamp 412, timestamp 414, and timestamp 416 provide validity information on folio 402, folio 404, and folio 406, respectively. Alternatively, the data in the folio headers may include version number, or other suitable forms that provides the validity information. Portfolio 400 also has dependency 408 and dependency 410 that relate two or more folios 402, 404 and 406. Each dependency 408 and 410 indicates that a particular folio depends on one or more other folios. In FIG. 4, dependency 408 describes a dependency relationship between folio 402 and folio 404; and dependency 410 describes a dependency relationship between folio 404 and folio 406.

Each dependency 408 and 410 has an associated update strategy 418 and 420. The update strategy 418 and 420 describes the actions to be taken when an associated folio is outdated. An update strategy 418 and 420 can automatically delete a folio 402 404 and 406 that is out of date, or can include a message that asks a user to delete the folio 402, 404 and 406 when it is out of date. The update strategy 418 and 420 can also mark the folio as outdated, but preserve the contents of the folio. The update strategy 418 and 420 can describe how to regenerate the folio contents when explicitly requested by a user. The update strategy 418 and 420 can also specify how to automatically update the folio when it is out of date and replace the current contents of the folio 402,404 and 406 with the updated contents. When the contents of the folio 402,406 and 408 change automatically or by user request, the update strategy 418 and 420 can specify how to compute the new version tag and stored it hi the folio header. The update strategy 418 and 420 can also specify whether a map (see e.g., 318, 324 and 330 in FIG. 3) describing the changes will also be stored in the folio 404,404 and 406. The update strategy 418 and 420 can also specify a time delay for the updating operation, which may take place immediately, once an hour, once a day, or some other interval that could be fixed or dependent on the scope and details of the change.

The update strategy 418 and 420 can use available map(s) for the corresponding source(s) to update the contents of the folio. The update strategy 418 and 420 can also alternatively choose not to use map(s) to update the contents of the folios. Hence, there are many ways one can regenerate the contents of the folio. For example, if a source change involves only deletions from the previous source, one set of instructions may be used, whereas if the source change involves additions and deletions, a different set of instructions may be used and so on. The update strategy 418 and 420 may further include multiple instructions from which the update strategy 418 and 420 would decide which one would be used to update the contents of the folio. The update strategy may consider information, such as the amount of time since the folio was last accessed or the amount of time since the folio was last changed, before making a determination of which method of set of instructions would be used to update the folio. The updated strategies are not limited to a specific method or set of instructions; rather and that these strategies may involve so-called "learning" strategies as well as explicit algorithms for updating.

Each folio 402, 404 and 406 can further include or reference map instructions when an update strategy 418 and 420 or explicit user request causes the folio contents to be changed. The instructions can include instructions on how to create one or more kinds of maps to describe the changes. For example, a change that involves only additions may have a first kind of map, a change that involves only deletions may have a second kind of map, and a change that involves both additions and deletions may involve a third kind of map. In some cases, for example, when the contents are totally replaced, the map instructions may specify that is created.

FIG. 4 illustrates that update strategy 418 corresponds to dependency 408 and provides information on how to keep folio 402 and folio 404 consistent with each other. For example, if folio 404 depends on folio 402, then update strategy 418 provides information on how to update folio 404 if a change in folio 402 is detected. Similarly, update strategy 420 corresponds to dependency 410 and provides information on how to keep folio 404 and 406 consistent. Update strategy 420 may provide that a map should be used to keep folio 404 and folio 406 consistent. For example, if folio 404 depends on folio 406, strategy 420 may include information that a map needs to be created when a change in folio 406 is detected so that folio 404 may be updated accordingly. The map may include what changes were made to folio 406. A map is not required to be used in order to keep related folios consistent, but at times, it may be helpful.

Each update strategy 418 and 420 may cause one or more programs to be invoked that read one or more folios that were changed and update one or more other folios depending on the change. FIG. 4 illustrates program 422 is associated with update strategy 418 and is invoked by update strategy 418 to keep folios 402 and 404 consistent. For example, if folio 404 depends on folio 402, program 422 may read folio 402 and write folio 404 following the information in update strategy 418 on how to update 404 when a change in folio 402 is detected. FIG. 4 also illustrates that program 424 is associated with update strategy 420 and is invoked by update strategy 420 to keep folios 404 and 406 consistent. For example, if folio 404 depends on folio 406, program 424 can read folio 406 and write folio 404. If update strategy 420 requires or recommends the use of a map, program 424 then may create map 426 or invoke another program to create a map before updating folio 404. Timestamp 412, timestamp 414, and timestamp 416 are updated every time a change is made to their corresponding folio. Alternative but equivalent techniques might be employed such as version numbers or revision numbers. One of ordinary skill in the art will appreciate that the illustrative embodiments provided herein should not be used to limit the scope of the invention.

A portfolio may be used for different applications or purposes. For example, a folio can be provided for publication purposes, where the folio associates with the program folio and includes information on fonts and colors that would be used to print the text in the program folio. In another example, a folio can be created to document the application programming interface (API), where the folio associates information with each function/method or class in the program folio or the folio that includes the parse tree. Information about the source code can be accessed by giving the name of the portfolio and the folio name. In one embodiment of the invention, each folio contains information about which other folio it depends on. Alternatively, separate sections of the portfolio can be used to store the dependency information between the folios, similar to the Makefile that is used in UNIX and LINUX to control the Make utility.

The exemplary embodiments are not only useful for maintaining related information up to date, but also it is useful to present different views to different applications or users. Depending on the kind of the information requested, different folio can be presented. One of ordinary skill in the art will appreciate that any programming language and/or system can be used.

A file format capable of including multiple files can be used to implement a portfolio. Such file format may be, for example, zip file format, tar file format, etc. As such, the individual folios can be represented by subfiles in the zip file. The "timestamp" information in the zip file can be used to decide whether a folio is up to date with respect to another folio. Additional subfiles can be provided to contain maps that track the differences in the folios. In one embodiment of the invention, one or more subfiles with reserved names could be used to hold the dependency information between the folios. The dependency information can include dependencies between the folios and describe how and when a folio is updated when another folio changes. As an example, given that there is a folio called program and a folio called documentation, then the subfile containing the dependency information may include text that looks like the following:

FOLIO program WITH_MAPS
FOLIO documentation
documentation DEPENDS_ON program

The first two lines describe the program and documentation folios. The phrase WITH_MAPS indicates that changes in this folio are to be accompanied by maps, which can also be stored in the zip file with a name that is derived from the folio name. The final line in the dependency information asserts that the documentation folio depends on the program folio. One of ordinary skill in the art will appreciate that the dependency information may be represented using other forms other than text, such as, binary, XML, other suitable data language, or graphical representation. A convention may be used so that a folio that produces a map does not require other folios to be updated, but other conventions may also be used to require otherwise.

An example of a map that describes the text change in the program folio may look like the following that indicates changes in the lines of text:

CHANGE LINE 3 TO
\*\*\* Copyright 2005-2006 \*\*\*
AFTER LINE 3 INSERT 1 LINE
\*\*\* All Rights Reserved \*\*\*
DELETE LINES 15-18
CHANGE LINES 28-29 TO 2 LINES
x=y+15;
z=foobar (92);
END OF CHANGE This exemplary map is made up of lines that describe an action to be taken (such as adding, deleting, or changing lines) followed by the new content, if any. In another embodiment of the invention, the map can display the text changes by underlining additions and striking thorough deletions. Instead of plaintext, maps can be in a form that can be easily read by a computer but not easily understood by humans, such as binary data.

In another example, given a portfolio including three folios: program, data, and report, the data folio can include a matrix that includes data, such as, a financial data, sales figures, or other data. When changes occur in the data folio, a new matrix is generated and a map is created to show the differences between the new matrix and the old matrix. The map can simply have a list of matrix elements that are added, deleted, and changed to turn the old matrix into the new one. Maps can be generated for both the program folio and the data folio, or only the program folio, or only the data folio. An exemplary dependency information for this example may look like the following:

FOLIO text
FOLIO data WITH_MAP
FOLIO report
data DEPENDS_ON text:RUN reading_program
report DEPENDS_ON data:RUN report_generator This dependency information can associate a map with the data folio but not the program folio. The keyword RUN may be used to cause the command following the keyword to run whenever the dependency of the data folio on the text folio is violated, such as when the text folio is updated. In one embodiment of the invention, no further processing is performed when a map is generated, showing the changes from the old data to the new data. Other folios, such as the report folio, can be regenerated when requested. When a report is requested, the program report_generator would be run and since the report folio depends on the data folio, the program report_generator may access both the data folio and the one or more maps generated from the data folio to generate the report. An example of a map showing changes in a matrix in the data folio may look like the following:

matrix 100×100 becomes 101×100
insert after row 83
15, 27, . . . //data for the new row added in matrix
elements(88, 13:15) become
0, 3.14159, 2.718

Figure 5:
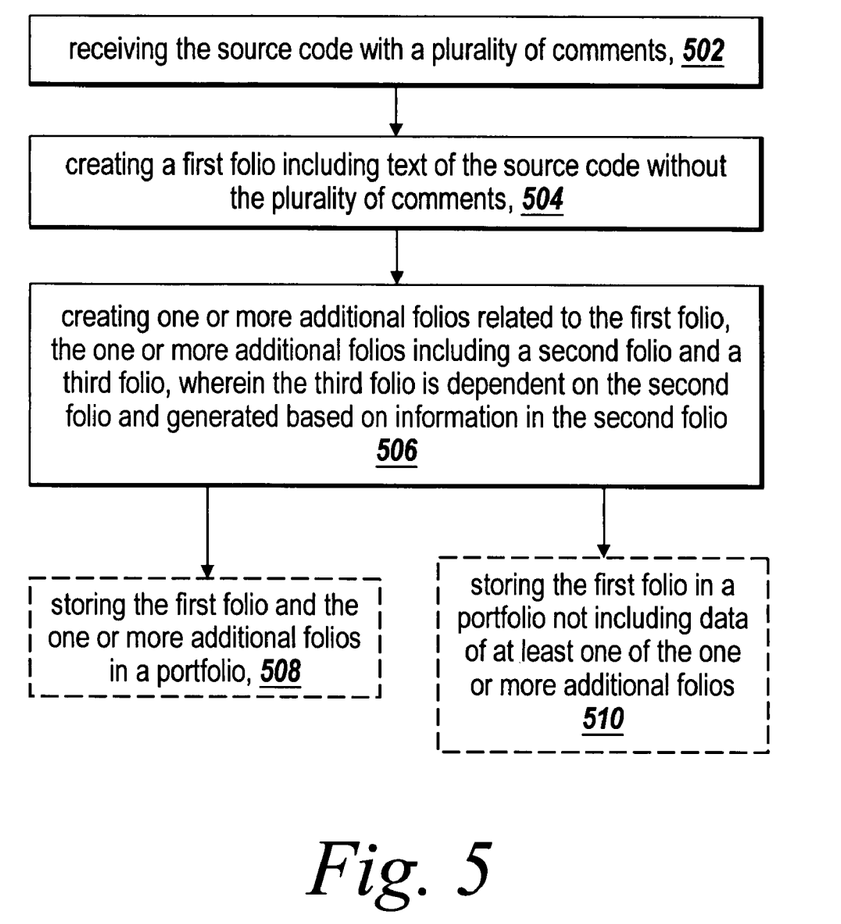
FIG. 5 illustrates a flow chart depicting steps taken to generate a portfolio according to an exemplary embodiment.

FIG. 5 illustrates a flow chart depicting steps taken to create a portfolio according to one embodiment of the invention. In step 502, portfolio generator 124 (FIG. 1) receives source code with multiple comments. Portfolio generator 124 generates a first folio including text of the source code without the comments in step 504. Portfolio generator 124 generates in step 406 one or more additional folios that are related to the first folio. These one or more additionally folios can be generated using the comments from the source code. The one or more additional folios include a second folio and a third folio, where the third folio depends on the second folio. Portfolio generator 124 then generates the second folio first and then generates the third folio based on the information in the second folio. The first folio and the one or more additional folios can be stored in a portfolio in step 508. Alternatively, some folios might not be stored in the portfolio but regenerated when required or some folios might access external databases when their data is requested. In this case, the first folio can be stored in a portfolio that does not include data in at least one of the one or more additional folios in step 510.

Figure 6:
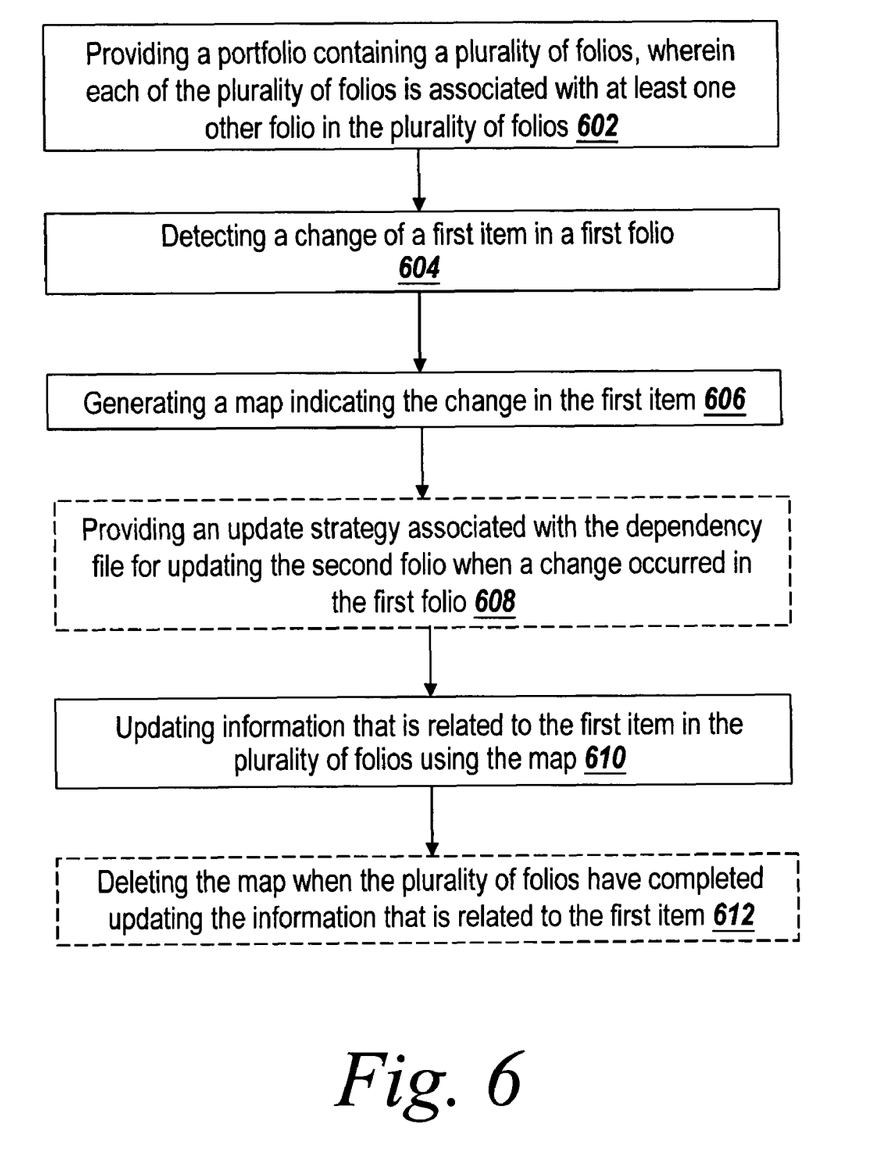
FIG. 6 illustrates a flow chart depicting steps taken to update a portfolio.

FIG. 6 illustrates a flow chart depicting steps taken to update a portfolio according to one embodiment of the invention. In step 602, a portfolio is provided containing multiple folios and at least a first folio and a second folio. In step 604, a dependency file is provided to describe a dependency relationship between the first folio and the second folio. In step 606, an update strategy is provided, where the update strategy is associated with the dependency file for updating the second folio when a change occurred in the first folio. A change can be, but not limited to, addition or deletion of graphical elements, addition or deletion of one or more characters or lines of code, signature of a function, test coverage information, performance information, profiling information, and a bug report. In step 608, a map may be optionally generated to indicate the change of the first folio and any other information that may be helpful for other dependent folios to make changes accordingly. In step 650, the update strategy is used to maintain the consistency between the first folio and the second folio. An update strategy is a set of instructions that describe how to update the information in a folio when there are changes in the other folios that the folio depends on. For example, if a change in a first folio involves appending new information to the end of the first folio, then the map describing this change might consist simply of an indication of the added lines, and the corresponding update strategy for one or more folios that depend on the first folio might be able to use the map to simply process the added lines rather than having to process the entire contents of the first folio. There are many different ways to update a folio, such as discarding the information in the folio, keeping the information in the folio and marking it "out of date", automatically recomputing/regenerating the information in the folio, automatically regenerating and replacing a folio, requesting a programmer to manually update some or all of the information, other suitable update methods, or a combination thereof.

In step 612, the map may be optionally used with the update strategy to keep the second folio up to date with the first folio. In other words, the update strategy may update information in the second folio that is related to the change in the first folio using the map. In one embodiment of the invention, a dependent folio can be implemented using a programming language, such as HTML, that can be used to include hidden information that the portfolio update tool 122 (FIG. 1) can use to identify which portion of the folio is related to which section of the source folio. Alternatively, headings can be provided in a dependent folio to be used as an indicator to identify the related section in the source folio. For example, assuming that the source folio is piece of source code and a dependent folio includes the API function definition, then the dependent folio may use function names as headings to identify what information in the dependent folio is related to which section or element in the source folio. Once the second folio has completed updating the information that is related to the change in the first folio, the map can be optionally deleted. One of ordinary skill in the art can appreciate that different implementations can be used to practice the invention and be able to easily collect and update associated information.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

I claim:

1. A method for collecting information related to a source code, the method comprising:
   receiving the source code with a plurality of comments;
   creating, in a portfolio, a first folio holding content, the content held in the first folio including text of the source code without the plurality of comments;
   creating, in the portfolio, one or more additional folios holding content that is related to the content held in the first folio, the one or more additional folios including a second folio and a third folio, where the content held in the third folio is dependent on the content held in the first or second folio and generated based on information in the content held in the first or second folio, and where the portfolio further includes:
      a dependency entry that indicates a relationship between the first or second folio and the third folio, the dependency indicating that the content in the third folio depends on the content in the first or second folio; and
      an update strategy entry associated with the dependency entry, the update strategy entry:
         including one or more executable instructions describing actions to be taken in the event a change in the content held in the first or second folio is identified, and
         determining if the content held in the third folio is to be updated to implement the identified change in the content held in the first or second folio;
   generating a map in response to an executable instruction from the update strategy entry, the map storing information indicating how data was changed in the first or second folio; and
   using the map to update the content held in the third folio if the update strategy entry determines that the content held in the third folio is to be updated.

2. The method of claim 1, wherein at least one of the one or more additional folios holding content is created using the plurality of comments from the source code.

3. The method of claim 1 further comprising:
   storing the one or more additional folios holding content in the portfolio.

4. The method of claim 1 wherein the portfolio excludes content held in at least one of the one or more additional folios.

5. The method of claim 4, wherein the content held in the at least one of the one or more additional folios is stored in a database.

6. The method of claim 4, wherein the content held in the at least one of the one or more additional folios is regenerated every time when the portfolio is accessed.

7. A non-transitory storage medium storing computer executable instructions for collecting information related to a source code, the instructions when executed causing at least one computing device to:
   receive the source code with a plurality of comments;
   create, in a portfolio, a first folio holding content, the content held in the first folio including text of the source code without the plurality of comments;
   create, in the portfolio, one or more additional folios holding content that is related to the content held in the first folio, the one or more additional folios including a second folio and a third folio, where the content held in the third folio is dependent on the content held in the first or second folio and generated based on information in the content held in the first or second folio, and where the portfolio further includes:
   a dependency entry that indicates a relationship between the first or second folio and the third folio, the dependency indicating that the content in the third folio depends on the content in the first or second folio; and
   an update strategy entry associated with the dependency entry, the update strategy entry:
   including one or more executable instructions describing actions to be taken in the event a change in the content held in the first or second folio is identified, and
   determining if the content held in the third folio is to be updated to implement the identified change in the content held in the first or second folio;
   generating a map in response to an executable instruction from the update strategy entry, the map storing information indicating how data was changed in the first or second folio; and
   using the map to update the content held in the third folio if the update strategy entry determines that the content held in the third folio is to be updated.

8. The medium of claim 7, wherein at least one of the one or more additional folios holding content is created using the plurality of comments from the source code.

9. The medium of claim 7 wherein the instructions when executed further cause the at least one computing device to:
   store the one or more additional folios holding content in the portfolio.

10. The medium of claim 7 wherein the portfolio excludes content held in at least one of the one or more additional folios.

11. The medium of claim 10, wherein the content held in the at least one of the one or more additional folios is stored in a database.

12. The medium of claim 10, wherein the content held in the at least one of the one or more additional folios is regenerated every time when the portfolio is accessed.

* * * * *

UNITED STATES PATENT AND TRADEMARK OFFICE
CERTIFICATE OF CORRECTION

| | | |
|---|---|---|
| PATENT NO. | : 8,209,350 B1 | Page 1 of 1 |
| APPLICATION NO. | : 11/900915 | |
| DATED | : June 26, 2012 | |
| INVENTOR(S) | : Steve Johnson | |

It is certified that error appears in the above-identified patent and that said Letters Patent is hereby corrected as shown below:

Title Page, Item (57), in the "Abstract of the printed patent, column 2, line 19, please delete "s" after the.

In the Specification of the Invention of the printed patent, column 4, line 52, please change "Inc" to --Inc.--.

In the Specification of the Invention of the printed patent, column 10, line 67, please change "report_generator" to --report generator--.

In the Specification of the Invention of the printed patent, column 11, line 2, please change "report_generator" to --report generator--.

Signed and Sealed this
Second Day of October, 2012

David J. Kappos
*Director of the United States Patent and Trademark Office*